(12) United States Patent
Kim et al.

(10) Patent No.: US 7,993,565 B2
(45) Date of Patent: Aug. 9, 2011

(54) FOLDING AND SHAPE-FORMING APPARATUS AND METHOD FOR PREPREG

(75) Inventors: Jae Hak Kim, Busan (KR); Joong Won Han, Busan (KR); Jae Hwan Lee, Busan (KR); Do Young Lee, Busan (KR); Jin Hyun Kim, Daegu (KR)

(73) Assignee: Korean Air Lines Co., Ltd., Seoul (KR)

( * ) Notice: Subject to any disclaimer, the term of this patent is extended or adjusted under 35 U.S.C. 154(b) by 0 days.

(21) Appl. No.: 12/411,309

(22) Filed: Mar. 25, 2009

(65) Prior Publication Data

US 2010/0170631 A1  Jul. 8, 2010

(30) Foreign Application Priority Data

Jan. 8, 2009 (KR) .................. 10-2009-0001388

(51) Int. Cl.
*B29C 70/44* (2006.01)
*B29C 51/10* (2006.01)
*B32B 31/00* (2006.01)

(52) U.S. Cl. ........ 264/314; 425/388; 425/403; 425/394; 156/382; 156/286; 264/511; 264/571

(58) Field of Classification Search .............. 425/384, 425/394, 403, 405.1, 388; 264/510, 511, 264/389, 571, 314; 156/381, 382, 285, 286, 156/212, 213
See application file for complete search history.

(56) References Cited

U.S. PATENT DOCUMENTS

| | | | | |
|---|---|---|---|---|
| 2,660,099 | A * | 11/1953 | Dunning | 493/217 |
| 3,247,550 | A * | 4/1966 | Haines, Jr. | 425/123 |
| 3,753,831 | A * | 8/1973 | Copithorne | 156/479 |
| 4,941,814 | A * | 7/1990 | Araki et al. | 425/388 |
| 5,002,476 | A * | 3/1991 | Kerr | 425/174.4 |
| 5,116,216 | A * | 5/1992 | Cochran et al. | 425/504 |
| 5,173,314 | A | 12/1992 | Hosoi | |
| 5,354,195 | A * | 10/1994 | Dublinski et al. | 425/504 |
| 5,529,472 | A * | 6/1996 | Jenkins | 425/388 |
| 5,648,109 | A | 7/1997 | Gutowski et al. | |
| 5,795,536 | A * | 8/1998 | Gaworowski et al. | 264/571 |
| 6,190,598 | B1 * | 2/2001 | Murphy et al. | 264/314 |
| 6,506,325 | B1 * | 1/2003 | Cartwright | 264/40.6 |
| 6,627,142 | B2 * | 9/2003 | Slaughter et al. | 264/510 |
| 6,852,268 | B1 * | 2/2005 | Valyi et al. | 264/510 |
| 7,195,476 | B2 * | 3/2007 | Ito | 425/388 |
| 7,204,951 | B2 * | 4/2007 | Simpson et al. | 264/523 |

(Continued)

FOREIGN PATENT DOCUMENTS

EP  2014448 A2  1/2009

(Continued)

*Primary Examiner* — Joseph Del Sole
*Assistant Examiner* — Nahida Sultana
(74) *Attorney, Agent, or Firm* — Rabin & Berdo, P.C.

(57) ABSTRACT

Disclosed is a folding and shape-forming apparatus for a prepreg which includes a vacuum chamber which can generate a vacuum pressure in the inside thereof, an expanding portion disposed inside the vacuum chamber, provided with a prepreg thereon, and expanding because of the vacuum pressure inside the vacuum chamber, a heating portion disposed inside the vacuum chamber for heating the prepreg, a mandrel loaded at a portion of an upper surface of the prepreg, a first pressing portion which is brought into contact with an upper surface of the mandrel to press the mandrel, and a second pressing portion which simultaneously presses both another portion of the upper surface of the prepreg and the expanding portion.

12 Claims, 6 Drawing Sheets

U.S. PATENT DOCUMENTS

| | | |
|---|---|---|
| 7,799,265 B2 * | 9/2010 | Nakazato et al. ............. 264/547 |
| 7,802,597 B2 * | 9/2010 | Okazaki et al. ............... 156/358 |
| 7,857,610 B2 * | 12/2010 | Rossi et al. ................... 425/398 |
| 2002/0068108 A1 * | 6/2002 | Iwaya ............................ 425/399 |
| 2006/0017200 A1 * | 1/2006 | Cundiff et al. ................ 264/511 |
| 2006/0249883 A1 | 11/2006 | Oguma et al. |
| 2007/0151656 A1 * | 7/2007 | Gager et al. .................. 156/212 |
| 2010/0139857 A1 * | 6/2010 | Pham et al. ................... 156/286 |
| 2010/0269978 A1 * | 10/2010 | Marengo et al. ............. 156/212 |

FOREIGN PATENT DOCUMENTS

| | | |
|---|---|---|
| WO | WO-96/06725 A1 | 3/1996 |

* cited by examiner

FOLDING AND SHAPE-FORMING APPARATUS AND METHOD FOR PREPREG

BACKGROUND OF THE INVENTION

1. Field of the Invention

The present invention relates to a folding and shape-forming apparatus for a prepreg, and more particularly to a folding and shape-forming apparatus for a prepreg which can shape the prepreg using vacuum pressure.

2. Description of the Related Art

Generally, the prepreg is a term for pre-impregnated composite fibers made by impregnating a highly elastic reinforced member, such as glass fiber, carbon fiber, Kevlar fiber, or the like with a base member, such as unsaturated polyester, epoxy resin, polyamide resin, or the like in a uniform rate. The prepreg is used in various industries which require high strength and elasticity, such as various kinds of sports machines, air planes, boats, or the like.

The prepreg must undergo a shape-forming process to have a form appropriate for the use thereof.

FIG. 1 is a schematic view illustrating a folding and shape-forming apparatus for a prepreg according to the conventional art. FIG. 2 is an operation status view illustrating operation status of the conventional folding and shape-forming apparatus for a prepreg.

As shown in FIG. 1, the folding and shape-forming apparatus for a prepreg according to the conventional art includes a vacuum chamber 10 which can create a vacuum state, an expanding portion 20 disposed inside the vacuum chamber 10, provided with a stack of prepregs P thereon, and expanding by inside vacuum pressure of the vacuum chamber 10, a heating portion 30 disposed inside the vacuum chamber 10 and heating the prepregs P for shape-formation of the prepregs, and a mandrel 40 which presses one upper side of the stack of prepregs P.

The upper surface of the vacuum chamber 10 is provided with a cover 11 so that the prepregs P can be put into and taken out of the vacuum chamber 10 through the cover 11.

The expanding portion 20 is placed under the vacuum chamber 10 in a flat form.

Operation of the conventional folding and shape-forming apparatus for a prepreg will be described below.

First, the stack of prepregs P to be shape-formed is disposed on the upper surface of the expanding portion 20 after opening the cover 11, and then the mandrel 40 is placed on one side of the upper surface of the stack of prepregs P.

After that, the cover 11 is closed and the vacuum chamber 10 is sealed. Next, an inside temperature of the vacuum chamber 10 is raised by starting the heating portion 30 so that the inter-layer slipping of the stack of prepregs P does not occur.

Next, vacuum pressure is applied to the vacuum chamber 10 so that the expanding portion 20 expands.

As shown in FIG. 2, when the expanding portion 20 is in an expanded state, some portion of the prepregs P other than a portion of the prepregs P on which the mandrel 40 is placed is folded by expansion of the expanding portion 20.

That is, the prepregs P are folded at edges thereof disposed under the mandrel 40. If the vacuum status inside the vacuum chamber 10 develops further and the inside vacuum status of the vacuum chamber 10 reaches a high degree, the folded portion of the prepregs P contacts the side of the mandrel 40.

As described above, the strength of the vacuum of the vacuum chamber 10 is gradually reduced after the folding of the prepregs P is completed, and the expanding portion 20 is recovered to the flat form as the vacuum pressure is eliminated.

Since the conventional folding and shape-forming apparatus for a prepreg has a structure which can shape the stack of prepregs 20 only because of the expanding force of the expanding portion 20, it is difficult to form the shape of prepregs P when the stack of the prepregs P is of a large thickness, for example, when the stack of prepregs P includes 20 or more layers of prepregs P.

Further, since the conventional folding and shape-forming apparatus for a prepreg P cannot transfer sufficient pressure to a corner of the mandrel 40 when folding the stack of prepregs being of a large thickness, there is a problem in that a folding portion of the prepreg product is likely to be wrinkled.

The conventional folding and shape-forming apparatus for a prepreg can shape the prepreg only in a straight form. That is, it has a drawback of it being difficult to shape the prepreg into a curved form or to produce a prepreg product having a plurality of folds or having a curved contour.

Furthermore, in the conventional folding and shape-forming apparatus for a prepreg P, since the prepreg P before shape-formation and the prepreg P after the shape-formation are put in and taken out via the cover 11, it is impossible to set up an automatic manufacturing process, so that productivity of the prepreg product is not good.

SUMMARY OF THE INVENTION

Accordingly, the present invention has been made keeping in mind the above problems occurring in the related art, and an object of the present invention is to provide a folding and shape-forming apparatus for a prepreg, which can shape the prepreg into a form having a plurality of folds, i.e. a folded contour, and produce prepreg products by an automatic manufacturing process so that productivity of the prepreg formation improves.

According to one aspect of the invention, there is provided a folding and shape-forming apparatus for a prepreg which could include a vacuum chamber having a space which can be vacuumed, an expanding portion disposed inside the vacuum chamber, provided with the prepreg thereon and expanding according to inside vacuum pressure of the vacuum chamber, a heating portion disposed inside the vacuum chamber and heating the prepreg, a mandrel loaded at a side of one upper surface of the prepreg, a first pressing portion which contacts the upper surface of the mandrel so as to press the mandrel, and a second pressing portion which simultaneously presses another portion of the upper surface of the prepreg and the expanding portion.

In the folding and shape-forming apparatus for a prepreg, it is preferable that the vacuum chamber is composed of an upper movable portion and a lower movable portion which can be combined with and separated from each other, in which the upper movable portion is combined with a structure frame so as to slide in a vertical direction and provided with the first and second pressing portions and in which the lower movable portion is disposed so as to be movable in a horizontal direction and be provided with the prepreg, the expanding portion, and the mandrel.

In the folding and shape-forming apparatus for a prepreg, it is preferable that the mandrel have a block form in which opposing side surfaces and a bottom surface are flat.

In the folding and shape-forming apparatus for a prepreg, it is preferable that a length of the prepreg be smaller than that of the expanding portion.

In the folding and shape-forming apparatus for a prepreg, it is preferable that the first pressing portion be composed of bladders expanding by air injected thereinto.

In the folding and shape-forming apparatus for a prepreg, it is preferable that the expanding portion be composed of a sealed expandable rubber.

In the folding and shape-forming apparatus for a prepreg, it is preferable that the second pressing portion be composed of any one of an electric motor, a pneumatic cylinder, and a hydraulic cylinder, a piston of which is simultaneously brought into contact with the prepregs and the expanding portion and the piston can be placed close to both sides of the mandrel.

In the folding and shape-forming apparatus for a prepreg, it is preferable that the bladders can pressure the entire upper surface of the mandrel at a uniform pressure so that a horizontal posture of the mandrel is maintained when the expanding portion is in an expanded state.

According to another aspect of the invention, there is provided a folding and shape-forming method for a prepreg which could include a prepreg stacking step of loading an expanding portion on an upper surface of a lower movable portion provided with a heating portion, stacking prepregs on an upper surface of the expanding portion, and loading a mandrel at a center of an upper surface of the prepreg, a vacuum chamber assembling step of assembling a vacuum chamber by combining an upper movable portion provided with a first pressing portion and a second pressing portion with the lower movable portion so as to be sealed, a first pressing step of pressing the mandrel by causing the first pressing portion to contact an upper portion of the mandrel, a second pressing step of pressing the prepregs by causing the second pressing portion to press both the prepregs and the expanding portion and by disposing the second pressing portion to be close to both sides of the mandrel, a prepreg heating step of heating the prepregs by the heating portion, a vacuuming and expanding step of expanding the expanding portion by creating vacuum pressure inside the vacuum chamber formed by the upper movable portion and the second movable portion, a vacuum releasing step of eliminating the vacuum pressure inside the vacuum chamber and lifting the press by the first pressing portion and the second pressing portion, and a vacuum chamber disassembling step of disassembling the vacuum chamber into the upper movable portion and the second movable portion.

The folding and shape-forming apparatus for a prepreg according to the invention can shape the prepreg by expanding force of the expanding portion which is applied to the lower surface of the stack of prepregs and the pressures attributable to the first and second pressing portions which are applied to the upper surface of the stack of prepregs. Accordingly, it can easily fold and shape the prepreg even if the stack of the prepregs is thick, and can transfer sufficient pressure to a corner of the mandrel by the pressure applied to an upper surface and a lower surface of the stack of prepregs so that wrinkles are not formed.

The folding and shape-forming apparatus for a prepreg according to the invention is provided with the expanding portion and a plurality of pressing portions, such as the first pressing portion and the second pressing portion. Accordingly, it has an advantage of being capable of shaping the prepregs into a form with a plurality of folds or a contour.

The folding and shape-forming apparatus for a prepreg according to the invention can easily arrange the prepregs before performing shape-formation, and therefore it is possible to continuously perform the shape-forming process. Accordingly, it has an advantage of improving the productivity.

The folding and shape-forming apparatus for a prepreg according to the invention is provided with the second pressing portion which contacts the upper surface of the mandrel so as to press the prepreg. Accordingly, it can reduce the load of the mandrel as compared with the conventional art.

BRIEF DESCRIPTION OF THE DRAWINGS

The above and other objects, features and advantages of the present invention will be more clearly understood from the following detailed description when taken in conjunction with the accompanying drawings, in which.

DETAILED DESCRIPTION OF THE INVENTION

Figure 1:
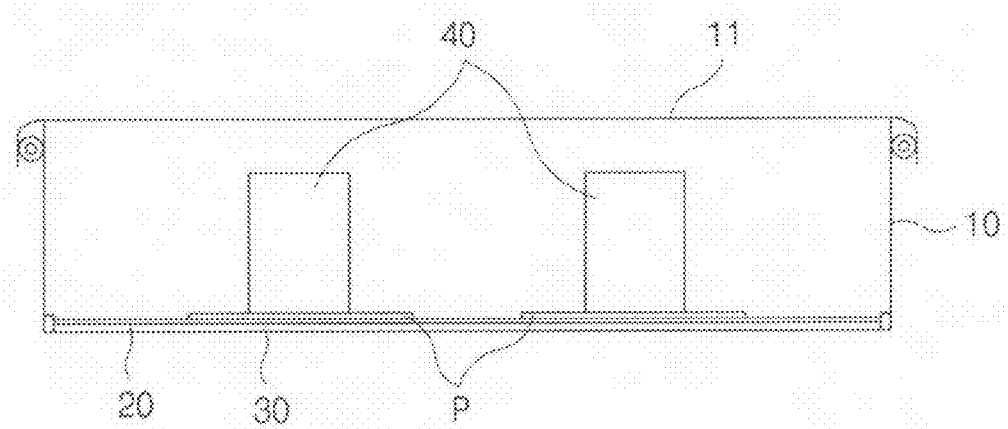
FIG. 1 is a schematic view illustrating a folding and shape-forming apparatus for a prepreg according to the conventional art.
Figure 2:
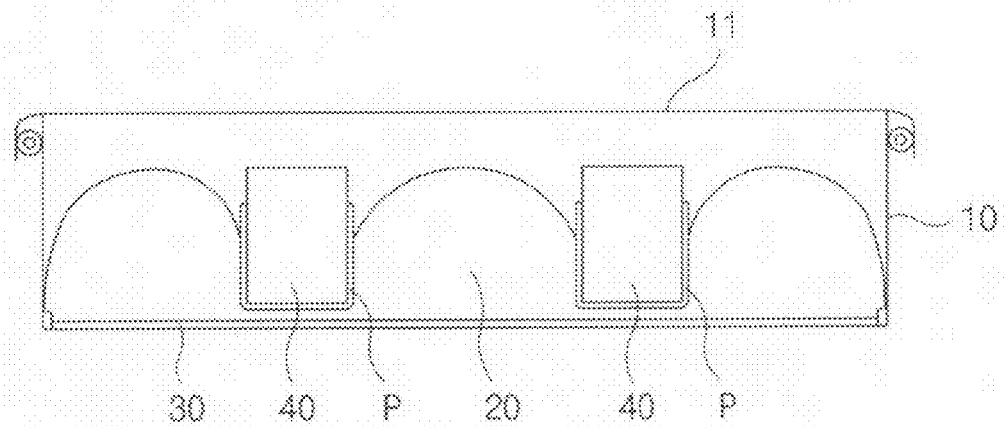
FIG. 2 is an operation status view illustrating operation status of the conventional folding and shape-forming apparatus for a prepreg.

Reference will now be made in greater detail to exemplary embodiments of the invention, an example of which is illustrated in the accompanying drawings. Wherever possible, the same reference numerals will be used throughout the drawings and the description to refer to the same or like parts.

Hereinafter, embodiments of the invention will be described with reference to the accompanying drawings. Terms used in the specification and claims may not be intended to adhere exclusively to dictionary definitions, but may refer to meanings and concepts in accordance with the technical spirit of the invention for the reason that an inventor can act as his or her own lexicographer in order to explain his or her invention in the best way.

The structure described in the present specification and illustrated in the accompanying drawings is just a preferred embodiment of the invention, but does not represent the technical spirit of the invention. Accordingly, at this point of time, it must be understood that there are various equivalents and modifications which can substitute for the above-described embodiments.

Figure 3:
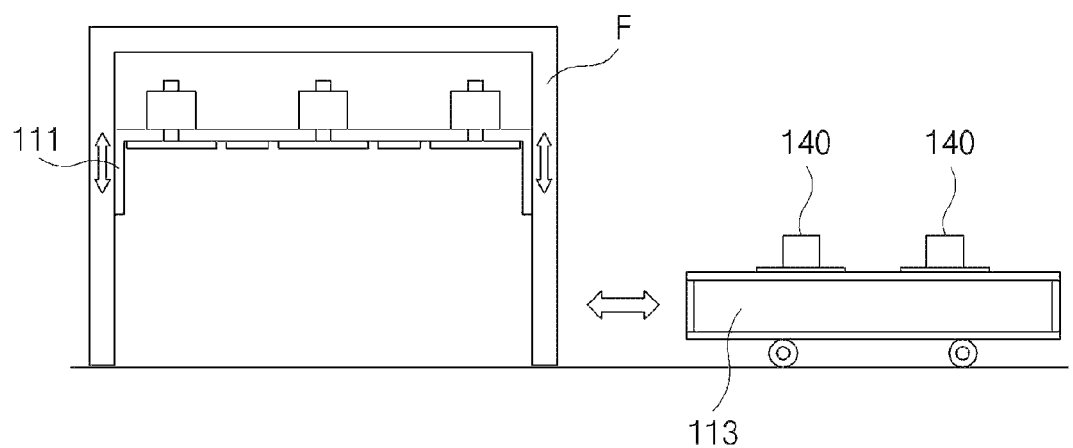
FIG. 3 is a schematic view illustrating a folding and shape-forming apparatus for a prepreg according to one embodiment of the invention.
Figure 4:
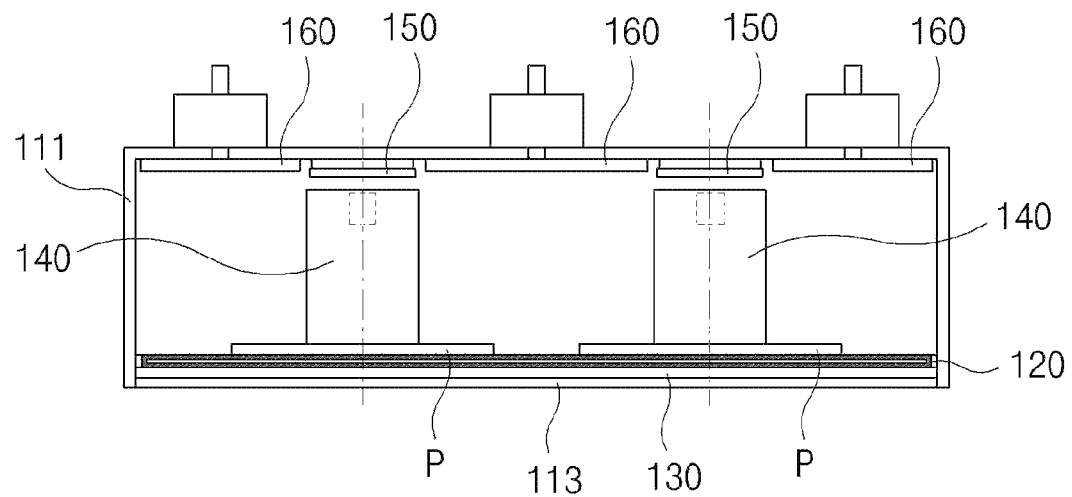
FIG. 4 is a schematic view illustrating an inside structure of a vacuum chamber of the folding and shape-forming apparatus for a prepreg according to the invention.
Figure 8:
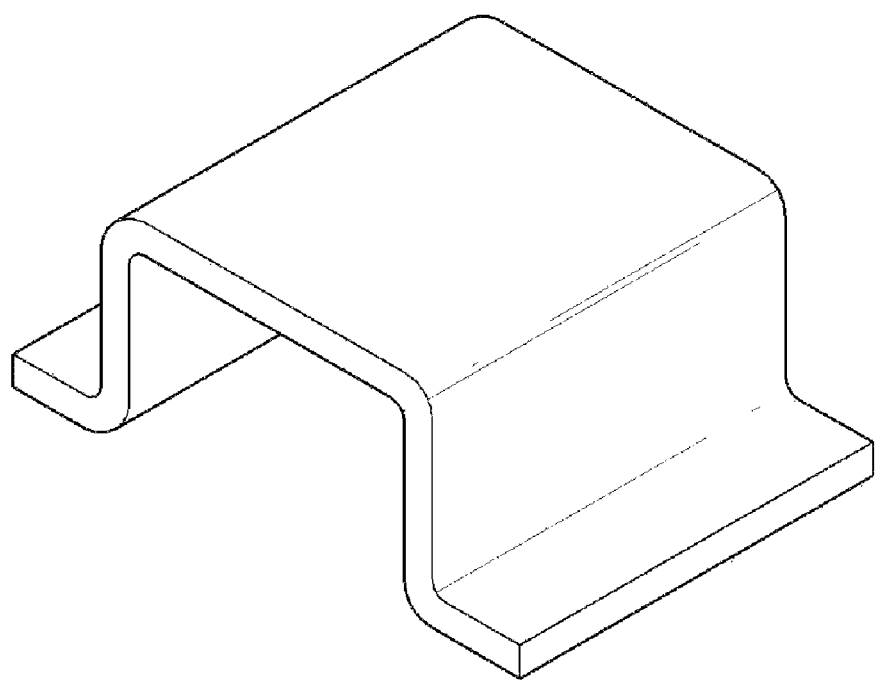
FIGS. 8 to 9 are perspective views illustrating a product which is formed by the folding and shape-forming apparatus for a prepreg according to the invention.
Figure 9:
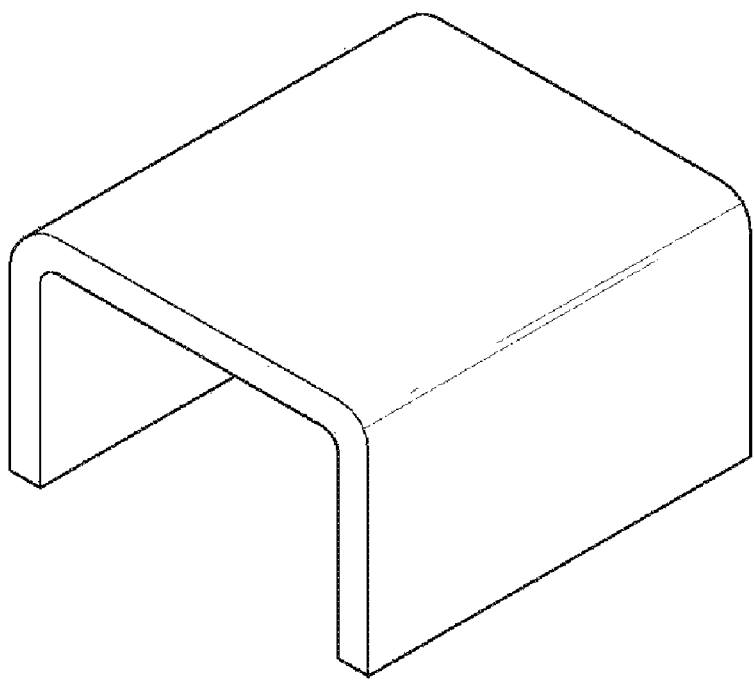

FIG. 3 is a schematic view illustrating a folding and shape-forming apparatus for a prepreg according to the invention. FIG. 4 is a schematic view illustrating an inside structure of a vacuum chamber of the folding and shape-forming apparatus for a prepreg according to the invention. FIGS. 8 to 9 are perspective views illustrating prepreg products formed by the folding and shape-forming apparatus for a prepreg according to the invention.

The folding and shape-forming apparatus for a prepreg according to the invention includes a vacuum chamber of which the inside space thereof can be vacuumed, an expanding portion 120 disposed inside the vacuum chamber, provided with a prepreg P on an upper portion thereof, and expanding according to a vacuum pressure of the vacuum chamber, a heating portion 130 disposed inside the vacuum chamber and heating the prepreg P, a mandrel 140 disposed at a portion of an upper surface of the prepreg P, a first pressing portion 150 which contacts the upper surface of the mandrel 140 so as to press the mandrel 140, and a second pressing portion 160 which simultaneously presses another portion of the upper surface of the prepreg P and the expanding portion 120.

The vacuum chamber is composed of an upper movable portion 111 and a lower movable portion 113 which can be combined with and separated from each other. The upper movable portion 111 is combined with a structure frame F in a sliding manner in a vertical direction and provided with the first pressing portion 150 and the second pressing portion 160. The lower movable portion 113 is disposed in a laterally movable manner and provided with the prepregs P, the expanding portion 120, and the mandrel 140.

As shown in FIG. 3, the upper movable portion 111 of the vacuum chamber is combined with a structure frame F fixed to the ground or a stable structure in a sliding manner in a vertical direction. The lower movable portion 113 of the vacuum chamber is provided with a moving unit so that it can move to the underside of the upper movable portion 111.

That is, the lower movable portion 113 loaded with the prepregs P, the expanding portion 120, and the mandrel 140 is transported in order to shape the prepregs P.

The prepregs P are stacked to be a stack of prepregs which is sufficiently thick, i.e. which could include 20 or more layers of prepregs. The stack of prepregs P is placed at an appropriate position of an upper surface of the expanding portion 120.

The first pressing portion 150 is composed of bladders which expand when air is introduced thereinto. The first pressing portion 150 is structured so as to expand by a positive pressure applied to the inside thereof so that the mandrel 140 is fixed in its position and is pressed. The first pressing portion 150 is fixed to an upper portion in the inside space of the upper movable portion 111.

The first pressing portion 150 is connected to an air supply and discharge device so that air is supplied and discharged if it is necessary.

The first pressing portion 150 presses the entire upper surface of the mandrel 140 so that the mandrel 140 is maintained horizontally when the expanding portion 120 expands.

The second pressing portion 160 is composed of any one of an electric motor, a pneumatic cylinder, and a hydraulic cylinder, a piston of which is simultaneously brought into contact with the prepregs P and the expanding portion 120 and arranged close to both sides of the mandrel 140. The electric motor is coupled to the piston via an electric motion portion which changes rotation motion of a rotor to linear motion of the piston.

That is, the mandrel 140 is loaded at the center of the upper surface of the prepreg P, and the second pressing portion 160 is brought into contact with an exposed portion of the upper surface of the prepreg P other than the portion provided with the mandrel 140 thereon.

The prepreg P is shorter than the expanding portion 120 in length. Accordingly, the second pressing portion 160 can simultaneously press both the prepreg P and the expanding portion 120.

The heating portion 130 may be composed of an electric heater which gives off heat by an electric device. The heating portion 130 is disposed on the upper surface of the lower movable portion 113 and the expanding portion 120 is positioned on the upper surface of the heating portion 130.

The expanding portion 120 is composed of a member which can expand when the inside space of the vacuum chamber falls to the vacuum state. For example, the expanding portion 120 may be made of a sealed rubber bag which can expand.

The upper surface of the expanding portion 120 is provided with the stack of prepregs P for shape-forming. The upper surface of the stack of prepregs P is loaded with the mandrel 140.

The mandrel 140 has a block shape having two opposite side surfaces and a bottom surface which are all flat. The mandrel 140 may have a different shape according to a target shape of the prepregs P.

The target shape of the prepregs which are shape-formed by the folding and shape-forming apparatus for a prepreg according to the invention may be a hat form shown in FIG. 8 or a letter C form shown in FIG. 9. The folding and shape-forming apparatus for a prepreg according to the invention has an advantage of being capable of forming the hat form of the prepreg as shown in FIG. 8 using the expanding portion 120 and the second pressing portion 160.

The advantageous effects of the above-mentioned folding and shape-forming apparatus for a prepreg will be described below.

Figure 5:
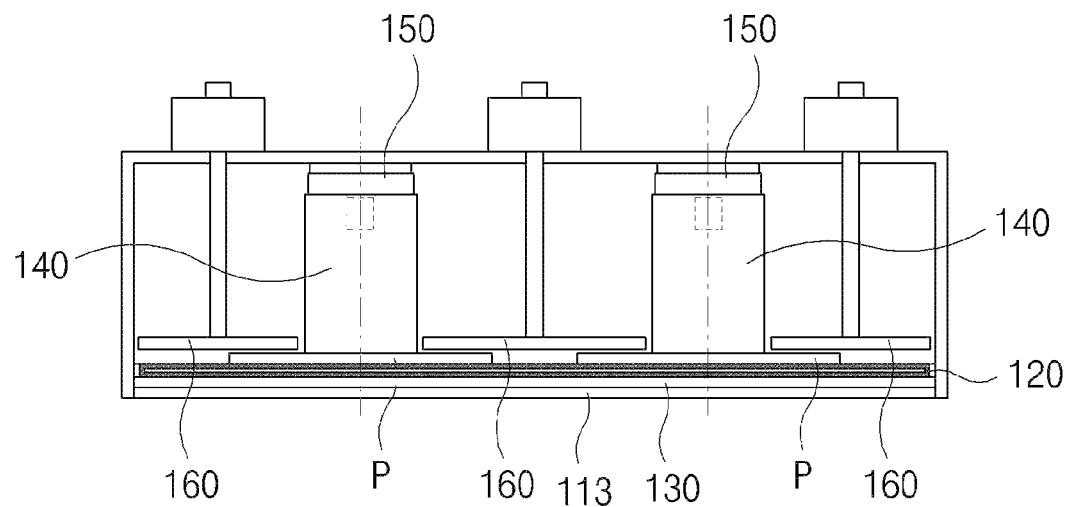
FIGS. 5 to 7 are operation status views illustrating operation of the folding and shape-forming apparatus for a prepreg according to the invention.
Figure 6:
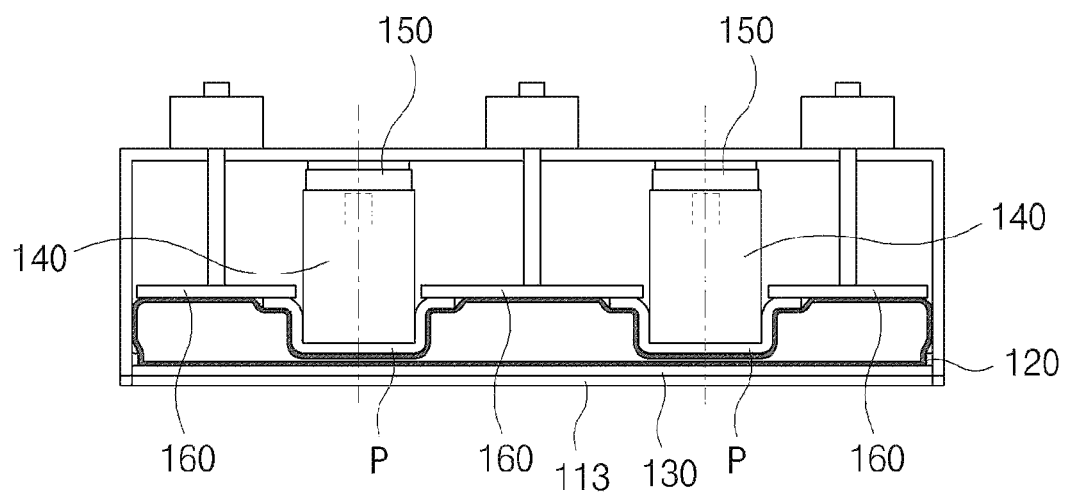
Figure 7:
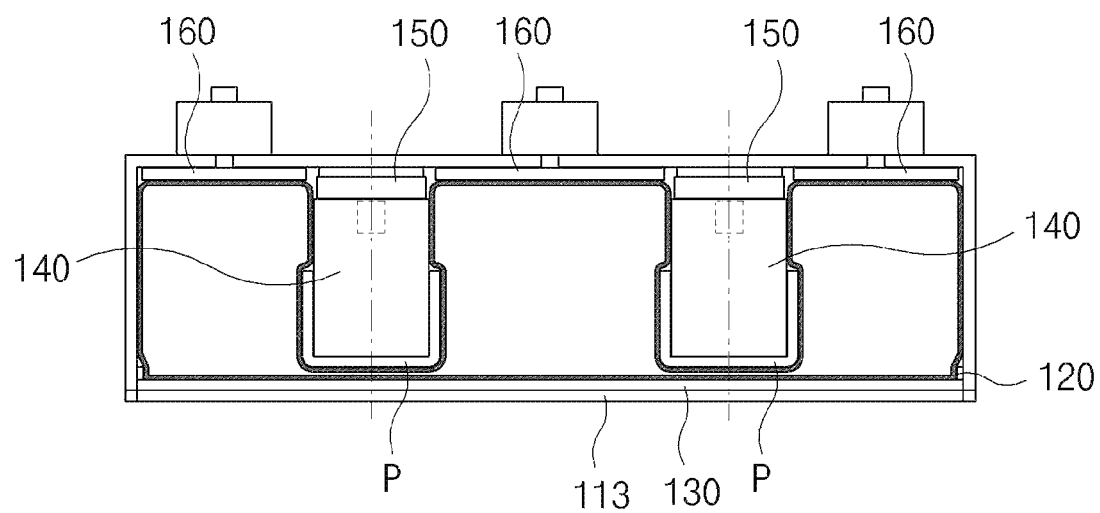
Figure 10:
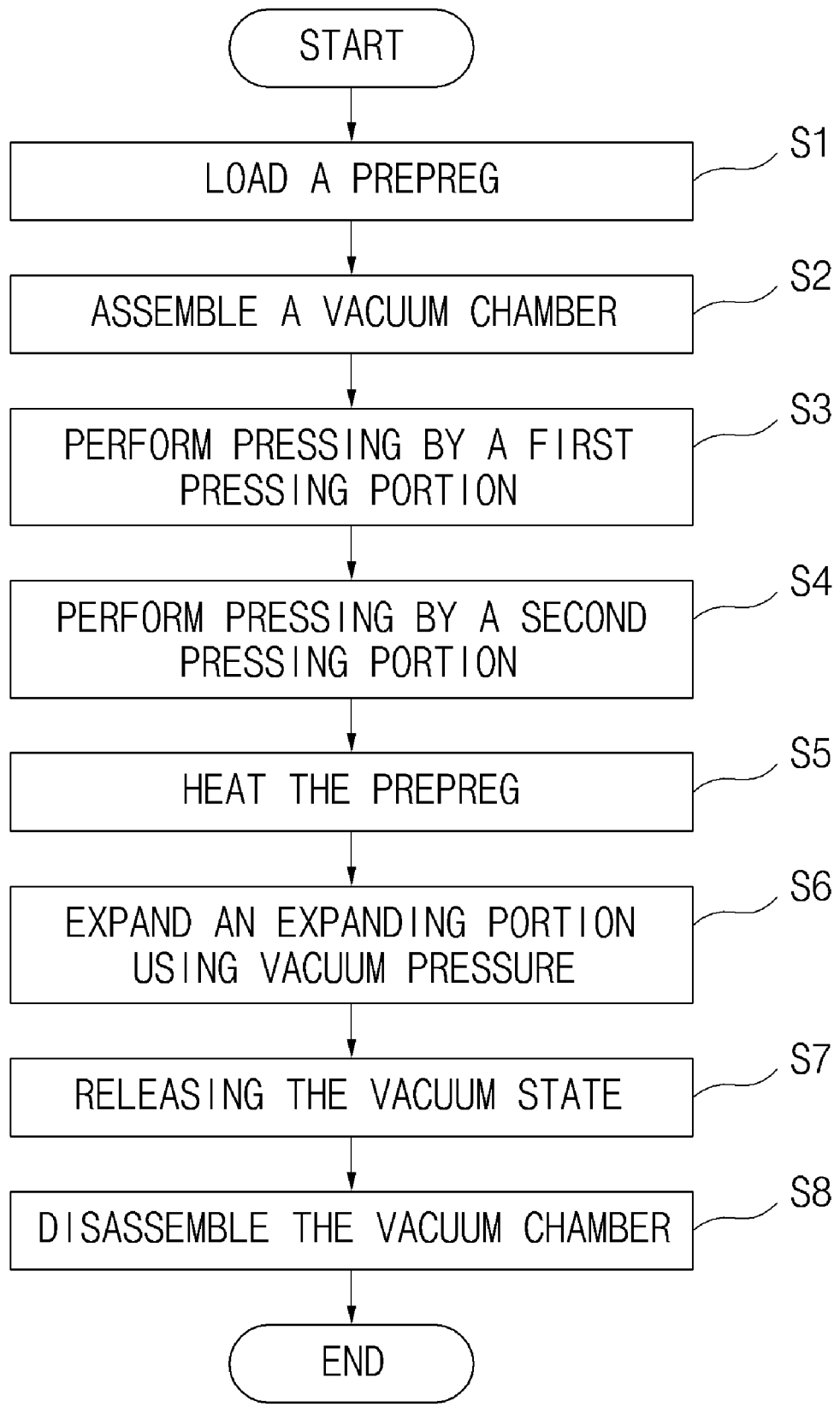
FIG. 10 is a flowchart illustrating a folding and shape-forming method for a prepreg according to the invention.

FIGS. 5, 6, and 7 are operation status views showing operations of the folding and shape-forming apparatus for a prepreg according to the invention. FIG. 10 is a flow chart illustrating a folding and shape-forming method for a prepreg according to the invention.

The folding and shape-forming method for a prepreg according to the invention includes a prepreg stacking step (S1) of loading the expanding portion 120 on the upper surface of the lower movable portion 113 equipped with the heating portion 130, loading the prepregs P on the upper surface of the expanding portion 120, and loading the mandrel 140 at the center of the upper surface of the uppermost layer of the prepregs P, a vacuum chamber assembling step (S2) of assembling a vacuum chamber with the upper movable portion 111 equipped with the first pressing portion 150 and the second pressing portion 160 and the lower movable portion 113, the upper movable portion 111 and the lower movable portion 113 being combined with each other and inside the vacuum chamber being sealed, a first pressing step (S3) of pressing the mandrel 140 by the first pressing portion 150 as the first pressing portion 150 is brought into contact with an upper portion of the mandrel 140, a second pressing step (S4) of pressing the prepregs P and the expanding portion 120 by the second pressing portion 160 in a manner such that the second pressing portion 160 presses the prepregs P while it is close to both sides of the mandrel 140, a prepreg heating step (S5) of heating the prepregs P by the heating portion 130, a vacuuming and expanding step (S6) of causing the expanding portion 120 to expand by creating a vacuum pressure in the vacuum chamber composed of the upper movable portion 111 and the lower movable portion 113, a vacuum releasing step (S7) of eliminating the vacuum pressure of the inside of the vacuum chamber and releasing pressing of the first pressing portion 150 and the second pressing portion 160, and a vacuum chamber disassembling step (S8) of disassembling the vacuum chamber into the upper movable portion 111 and the lower movable portion 113.

At the prepreg stacking step (S1), the expanding portion 120, the prepregs P, and the mandrel 140 are loaded on the upper surface of the lower movable portion 113 and then the lower movable portion is moved to be disposed under the upper movable portion 111.

At this time, the mandrel 140 is loaded at the center of the upper surface of the prepregs P, and the other portion of the upper surface of the prepregs P, which is not provided with the mandrel 140 thereon, is exposed to the air.

At the vacuum chamber assembling step (S2), the upper movable portion 111 disposed above the lower movable portion 113 is lowered, and then combined with the lower movable portion 113. As a result, the inside space of the combined body of the upper movable portion 111 and the lower movable portion 113 is sealed, and therefore the vacuum chamber is formed.

At the first pressing step (S3), air is introduced into the first pressing portion (150) i.e. the bladders, so that a positive pressure is applied to the mandrel 140. At this time, the first pressing portion 150 uniformly presses the upper surface of the mandrel 140 so that the mandrel 140 does not incline and maintains the horizontal posture.

At the second pressing step (S4), the second pressing portion 160, i.e. the piston, is lowered and brought into contact with both peripheral portions of the prepregs P which are exposed. As a result, the prepregs P are pressed by the second pressing portion 160. Furthermore, as the second pressing portion 160 is brought into contact with the expanding portion 120, the expanding portion 120 is also pressed by the second pressing portion 160.

At the prepreg heating step (S5), the heating portion 130 heats the prepregs P in order to soften the prepregs P.

At the vacuuming and expanding step (S6), the vacuum pressure is created inside the vacuum chamber composed of the upper movable portion 111 and the second movable portion 113 so that the expanding portion 120, i.e. an expandable rubber bag, is expanded. That is, an expanding pressure for expanding the expanding portion 120 is creased by the vacuum pressure of the vacuum chamber.

Since the sum of a weight of the mandrel 140 and the positive pressure of the first pressing portion 150 is greater than the expanding pressure of the expanding portion 120, the position of the center of the prepregs P which are in contact with the mandrel 140 is fixed. However, both of the two peripheral portions of the upper surface of the prepregs P which are not in contact with the mandrel 140 are bent owing to the expansion of the expanding portion 120.

In more detail, a second movable portion is forced to move upward by expansion of the expanding portion 120. At this time, the prepregs P are in a softened state owing to the heat from the heating portion 130, the peripheral portions of the prepregs are bent by the expanding force by the expanding portion 120 and come into contact with both sides of the mandrel 140. That is, the peripheral portions of the prepregs are bent along the corners of the mandrel 140. Moreover, since the prepregs are bent in a state in which they are in a softened state, it is possible to prevent wrinkles of the prepregs from occurring.

Since the prepregs P coming into contact with both sides of the mandrel 140 are peripheral portions which have been in contact with the piston, an area of the prepregs P which are brought into contact with the piston after expansion of the expanding portion 120 is smaller than an area of the prepregs which were in contact with the piston before the expansion.

After expansion, the expanding portion 120 presses the entire portion of the prepregs P and the first and second pressing portions 150 and 160 press the upper surface of the prepregs P, and it is possible to produce the prepreg having a folded shape and to improve the quality of the prepreg.

As shown in FIG. 7, the expanding portion 120 can be expanded in a manner such that the entire surface of the prepregs P is brought into contact with the mandrel 140.

At the vacuum releasing step (S7), the air introduced into the bladders is eliminated and the piston is forced to move upward so that the pressing is lifted.

At the vacuum chamber disassembling step (S8), the vacuum chamber is disassembled into the upper movable portion 111 and the lower movable portion 113. After that, the lower movable portion 113 progresses to the subsequent process step. After the lower movable portion is moved, it is moved to a position under the upper movable portion 113 again, and the above-mentioned folding and shape-forming processing is repeatedly performed.

The foregoing invention has been described in terms of preferred embodiments. However, those skilled in the art will recognize that the invention is not limited thereto but many variations of the embodiments exist. Such variations are intended to be within the scope of the present invention and the appended claims.

What is claimed is:

1. A folding and shape-forming apparatus for a prepreg, which comprises:
    a vacuum chamber generating a vacuum pressure inside thereof;
    an expanding portion disposed inside the vacuum chamber and expanding by the vacuum pressure of the inside the vacuum chamber, the prepreg being disposed on an upper surface of the expanding portion;
    a mandrel disposed on a portion of an upper surface of the prepreg, such that the prepreg is sandwiched between the expanding portion and the mandrel;
    a first pressing portion which is brought into contact with an upper surface of the mandrel to press the mandrel; and
    a second pressing portion which simultaneously presses both another portion of the upper surface of the prepreg and the expanding portion,
    wherein the vacuum chamber is composed of an upper movable portion and a lower movable portion which can be combined with and separated from each other, the upper movable portion being combined with a structure frame so as to slide in a vertical direction and provided with the first and second pressing portions, and the lower movable portion being disposed to be movable in a lateral direction and provided with the prepreg, the expanding portion, and the mandrel.

2. The folding and shape-forming apparatus for a prepreg according to claim 1, wherein the mandrel has a block shape with two opposing sides and a bottom being all flat.

3. The folding and shape-forming apparatus according to claim 1, wherein the prepreg is shorter than the expanding portion in length.

4. The folding and shape-forming apparatus according to claim 1, wherein the first pressing portion is composed of a bladder which expands when air is introduced thereinto.

5. The folding and shape-forming apparatus according to claim 1, wherein the expanding portion is sealed expandable rubber.

6. The folding and shape-forming apparatus according to claim 1, wherein the second pressing portion is composed of any one of an electric motor, a pneumatic cylinder, and a hydraulic cylinder, a piston of which is simultaneously brought into contact with both the prepreg and the expanding portion, and the piston is arranged so as to be close to both sides of the mandrel.

7. The folding and shape-forming apparatus according to claim 4, wherein the bladder uniformly presses the entire upper surface of the mandrel so that the mandrel horizontally stays when the expanding portion expands.

8. A folding and shape-forming method for a prepreg, which comprises:
- a prepreg stacking step of loading an expanding portion on an upper surface of a lower movable portion equipped with a heating portion, loading a prepreg on an upper surface of the expanding portion, and loading a mandrel at a center portion of an upper surface of the prepreg;
- a vacuum chamber assembling step of assembling a vacuum chamber by combining an upper movable portion equipped with a first pressing portion and a second pressing portion with the lower movable portion and sealing an inside of a combined body of the upper movable portion and the lower movable portion;
- a first pressing step of pressing the mandrel by the first pressing portion by bringing the first pressing portion into contact with an upper portion of the mandrel;
- a second pressing step of pressing the prepreg and the expanding portion by the second pressing portion in which the second pressing portion presses the prepreg while it is disposed close to both sides of the mandrel;
- a prepreg heating step of heating the prepreg by the heating portion;
- a vacuuming and expanding step of generating a vacuum pressure inside the vacuum chamber formed by the upper movable portion and the lower movable portion in order to expand the expanding portion;
- a vacuum releasing step of releasing the vacuum pressure inside the vacuum chamber and lifting pressing by the first and second pressing portions; and
- a vacuum chamber disassembling step of disassembling the vacuum chamber by separating the lower movable portion from the upper movable portion.

9. The folding and shape-forming apparatus according to claim 4, wherein the mandrel has a lower surface facing the prepreg and an upper surface non-facing the prepreg, and the bladder is disposed on the upper surface of the mandrel and is spaced apart from the prepreg.

10. The folding and shape-forming apparatus according to claim 1, wherein the prepreg comes in contact with the upper surface of the expanding portion.

11. The folding and shape-forming apparatus according to claim 1, wherein the mandrel comes in contact with the upper surface of the prepreg.

12. The folding and shape-forming apparatus according to claim 1, wherein a level at which a lower surface of the second pressing portion is disposed is adjustable independently of a level at which a lower surface of the first pressing portion is disposed.

* * * * *